United States Patent
Hata

(10) Patent No.: US 8,509,676 B2
(45) Date of Patent: Aug. 13, 2013

(54) PERFORATION DEVICE, POST-PROCESSING APPARATUS, AND IMAGE FORMING SYSTEM

(75) Inventor: Kiyoshi Hata, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 536 days.

(21) Appl. No.: 12/732,332

(22) Filed: Mar. 26, 2010

(65) Prior Publication Data

US 2010/0247202 A1 Sep. 30, 2010

(30) Foreign Application Priority Data

Mar. 30, 2009 (JP) .................... 2009-081751

(51) Int. Cl.
*G03G 15/00* (2006.01)
*G03G 21/00* (2006.01)
*B26F 1/04* (2006.01)

(52) U.S. Cl.
USPC ............................................ 399/407; 83/628

(58) Field of Classification Search
USPC ............................................ 399/407, 408
See application file for complete search history.

(56) References Cited

U.S. PATENT DOCUMENTS

| | | | | |
|---|---|---|---|---|
| 4,898,372 A | * | 2/1990 | Hirabayashi et al. | 270/58.12 |
| 4,988,030 A | * | 1/1991 | Muramatu et al. | 227/27 |
| 5,253,030 A | * | 10/1993 | Shigemura et al. | 399/407 |
| 6,622,908 B2 | * | 9/2003 | Fukumoto et al. | 234/98 |
| 7,823,494 B2 | * | 11/2010 | Baba | 83/628 |
| 2008/0236351 A1 | * | 10/2008 | Hidaka et al. | 83/73 |
| 2009/0110516 A1 | * | 4/2009 | Hasegawa et al. | 412/13 |
| 2009/0148215 A1 | * | 6/2009 | Takahashi et al. | 399/408 |

FOREIGN PATENT DOCUMENTS

| | | | |
|---|---|---|---|
| JP | 10-15899 A | | 1/1989 |
| JP | 01257598 A | * | 10/1989 |
| JP | 09136762 A | * | 5/1997 |
| JP | 10015899 A | * | 1/1998 |
| JP | 11077593 A | * | 3/1999 |
| JP | 2000-233396 | | 8/2000 |
| JP | 2005-212038 | | 8/2005 |
| JP | 2007062145 A | * | 3/2007 |

OTHER PUBLICATIONS

Japanese Office Action dated Apr. 2, 2013 (and English translation thereof) in counterpart Japanese Application No. 2009-081751.

* cited by examiner

*Primary Examiner* — Ren Yan
*Assistant Examiner* — Nguyen Q Ha
(74) *Attorney, Agent, or Firm* — Holtz, Holtz, Goodman & Chick, P.C.

(57) ABSTRACT

The above perforation device is equipped with a plurality of punches to punch holes on a sheet by a reciprocation motion; a holding board to hold the above punches in a line in the width direction of a sheet; a plurality of dies being arranged opposing to the above plurality of punches; two cranks being arranged at a drive shaft, rotate together with the above drive shaft, and being arranged with phases of an angle being displaced with each other in the shaft rotating direction; and two connection poles connecting with the above two cranks and the above holding board, wherein a differential perforation is carried out in such a manner that rotation of the above two cranks reciprocates the above punches, and during perforating cut-outs on a sheet, the above holding board reciprocates with phases at both ends being displaced, and the above plurality of punches carry out perforation of cut-outs with time difference from a punch at either end of the both ends to a punch at the other end successively.

6 Claims, 20 Drawing Sheets

PERFORATION DEVICE, POST-PROCESSING APPARATUS, AND IMAGE FORMING SYSTEM

This application is based on Japanese Patent Application No. 2009-081751 filed on Mar. 30, 2009, in Japanese Patent Office, the entire content of which is hereby incorporated by reference.

TECHNICAL FIELD

The present invention relates to a perforation device, which makes holes by punching at prescribed perforation positions of a sheet, a post-processing apparatus provided with the above perforation device, and an image forming system having the above post-processing apparatus.

BACKGROUND TECHNOLOGY

Recent image forming apparatus, such as an electrophotographic system, has high speed properties, multi-functions, and a network function, and enlarges their usages as a printing apparatus by connecting with a high-capacity sheet feed apparatus and a high-capacity stacker. In case the image forming apparatus is used as a printing apparatus, the image forming apparatus becomes possible to carry out from printing to bookbinding with one apparatus by connecting with a post-processing apparatus which binds printed matters (paper sheets on which images were formed).

As the post-processing apparatus, there has been known a gluing bookbinding apparatus, which is made small by arranging, devices, such as a sheet bundle storing section, a glue (an adhesive) application section, a cover sheet supply section, and a cover folding section in a column fashion in the vertical direction. The above bookbinding apparatus forms a booklet by applying an adhesive uniformly using an adhesive applying roller to a back of a sheet bundle, which is stored in a sheet bundle storing section and gripped. However, in case where an adhesive is applied only to a back of a sheet bundle, the bonded area is small, resulting in a shortage of strength of the glued binding. Coping with the above problem, it has been carried out to try to increase in the bonded strength by increasing a bonded area by forming a plurality of cut-outs using a perforation device at an end side of sheets, to which an adhesive is applied during a binding process of sheets.

Hereinafter, the above cut-out formation is also referred to as roughening.

The formation of a plurality of cut-outs using the above perforation device can be carried out while displacing perforation positions, even in case where, for example, the number of punch is one or two, which number is less than the number of cut-out. However, the punching while displacing perforation positions had a problem that it takes a lot of time for the perforation processing, resulting in decrease in processing ability of the whole apparatus. This problem affected, in particular, a high-speed machine.

Coping with the problem, there has been used a perforation device, which is provided with a plurality of punches, and forms a necessary number of cut-outs in one single action of perforation. However, in case where a plurality of punches are pushed down at the same time to punch holes in a sheet, a large force is required during the perforation. Further, there was a problem that, when the perforation is carried out at a time at an edge side of sheets, a force working in the direction of a sheet moving away increases, whereby a formation of cut-outs exhibiting an excellent shape and accuracy in position became difficult.

In order to minimize the above problem, it has been known that a differential perforation is effective, in which the perforation is successively carried out by allowing the perforation by each punch to have a time difference.

Corresponding to the above, a multi-hole punch (a perforation device) has been disclosed (refer, for example, to Patent Document 1) having a mechanism in such a manner that a lot of punches are arranged linearly, a punch holder (a holding board), which has a shape that the center part is convex downward and has a stairlike bumps in the both directions, is arranged in movable up and down, in the upper part of the above punches, and each of the punches comes down step by step in an order from the center one corresponding to a descent of the above punch holder.

Patent Document 1: Japanese Patent Application No. H10-15899

SUMMARY OF THE INVENTION

Figure 14A:
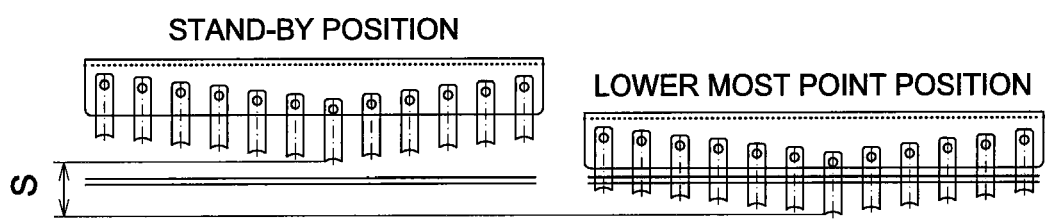
FIG. 14a is an illustration showing a stand-by position and a lower most point position described in Patent Document 1.
Figure 14B:
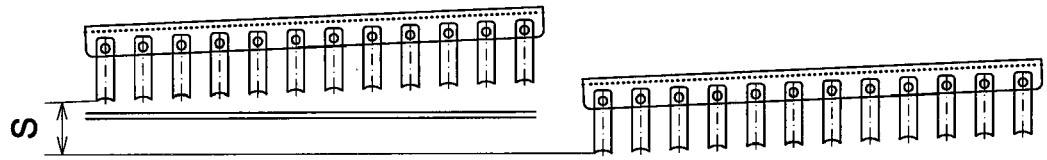
FIG. 14b is an illustration showing a stand-by position and a lower most point position described in conventional example 1, to be described below.

However, in the constitutions of Patent Document 1 and conventional example 1, to be described below, the more the number of punches, the more distance the punch installing positions are required to be displaced. Due to the above reason, stroke S of the reciprocation motion shown in FIGS. 14a and 14b becomes large, resulting in the above constitutions making the apparatus larger.

An aspect of the present invention is as follows.

Item 1. A perforation device, comprising:
a plurality of punches which punch holes on a sheet by a reciprocation motion;
a holding board which holds the above punches in a line in the width direction of a sheet;
a plurality of dies being arranged opposing to the above plurality of punches;
a drive shaft being rotary drivable by a driving device;
two cranks being arranged with phases of an angle being displaced with each other in the shaft rotating direction of the above drive shaft, and rotate together with the above drive shaft;
and two connection poles connecting with the above two cranks and the above holding board, wherein a differential perforation is carried out in such a manner that rotation of the above two cranks reciprocates the above holding board to reciprocate the above punches, and during perforating cut-outs on a sheet, the above holding board reciprocates with phases at both ends being displaced, and the above plurality of punches carry out perforation of cut-outs with time difference from a punch at either end of the both ends to a punch at the other end successively.

Item 2. A post-processing apparatus, wherein the post-processing apparatus is provided with a connection device which connects with the post-processing apparatus with the perforation device described in above Item 1 and an image forming apparatus.

Item 3. An image forming system comprising an image forming apparatus, which forms an image in a sheet, and the post-processing apparatus described in Item 2, which receives a sheet, in which an image is formed by the above image forming apparatus, and makes a post-processing in the sheet.

The invention in Patent Document 1 prevents an increase in force during perforation and decrease in accuracy of holes, by a method, in which punches are installed in a manner that the punch installing position is displaced in the reciprocation direction against a holding board, each of the punches comes down step by step in an order four the center one corresponding to a descent of the above punch holder, and the perforation is carried out in an order from the center one.

Also a method (referred to as conventional example 1) has been known, in which, by allowing a holding board, which holds a plurality of punches, to reciprocate in an oblique fashion, each of punches is allowed to come down step by step in an order from one side to the other side corresponding to a descent of the holding board, and then, the perforation is carried out in an order from one side.

BRIEF DESCRIPTIONS OF THE DRAWINGS

Figure 1:
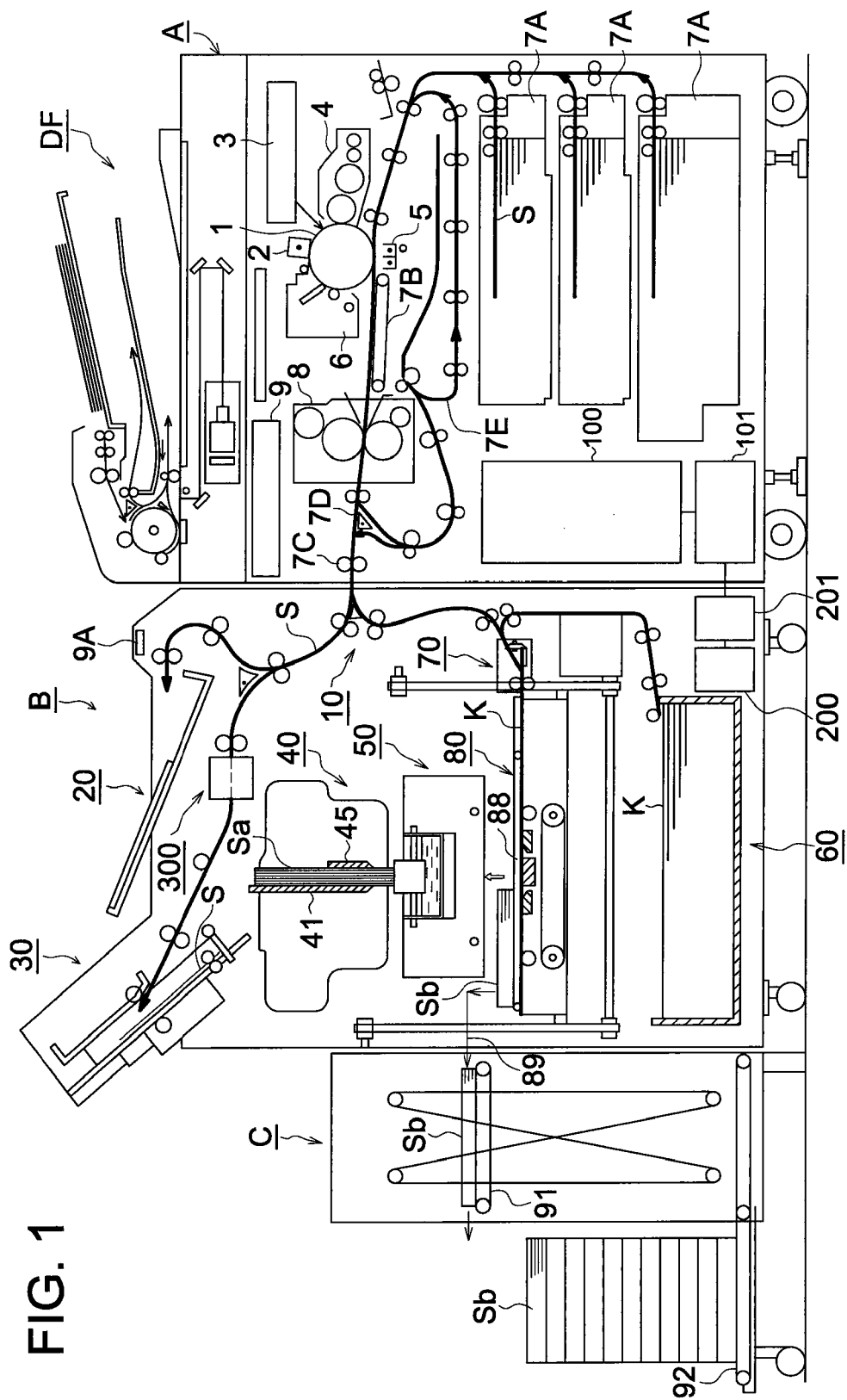

FIG. 1 is an entire structural view of an image forming apparatus provided with the main part of an image forming apparatus, a bookbinding apparatus, and a booklet storing apparatus.

Figure 2:
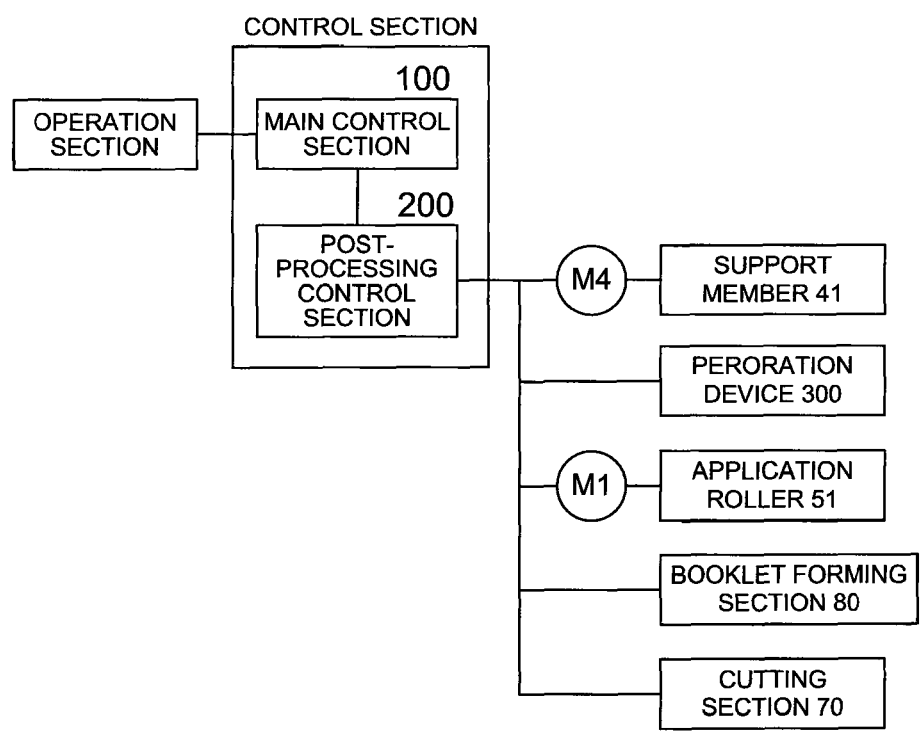

FIG. 2 is a block diagram showing a control of the present invention.

Figure 3:
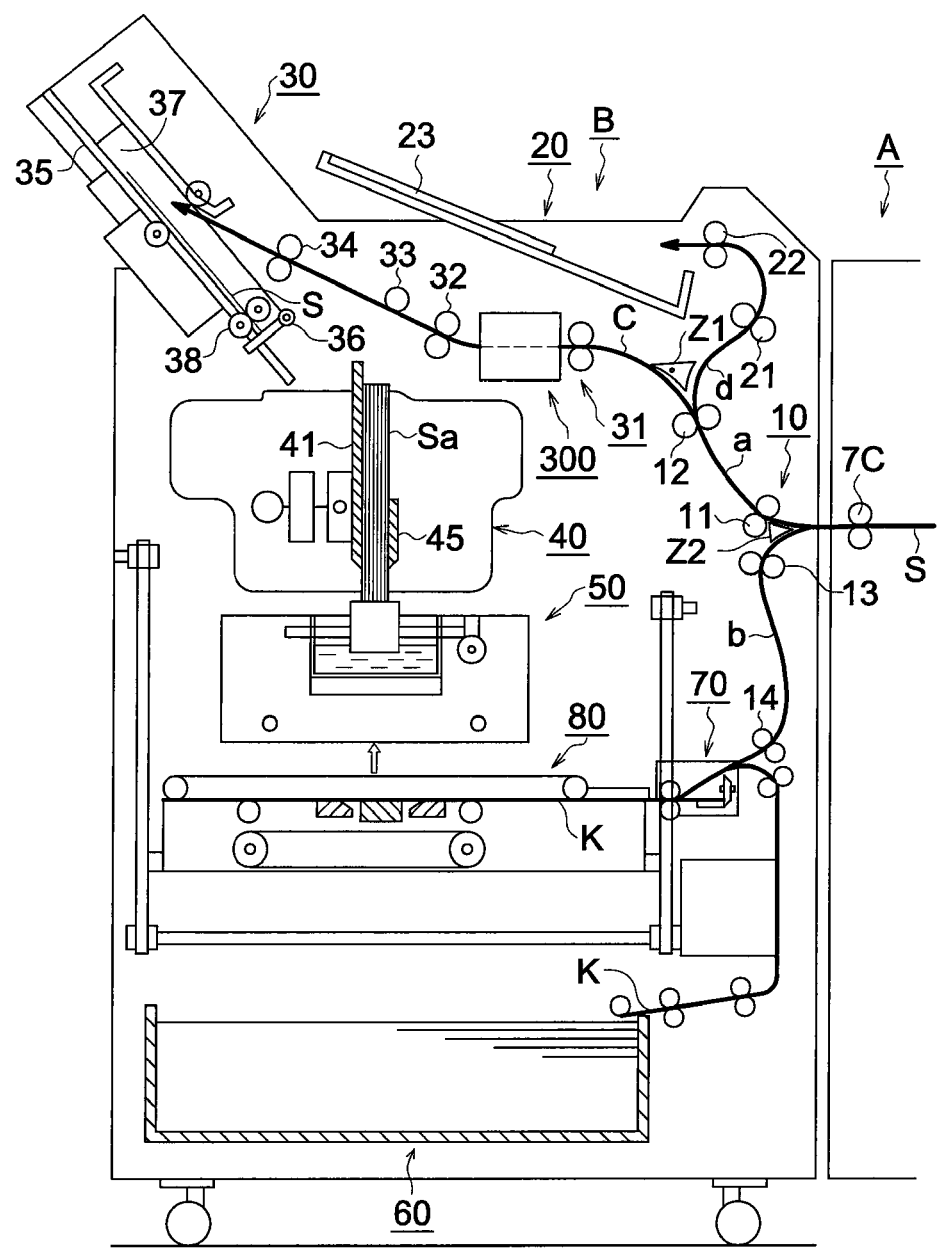

FIG. 3 is a cross section of a bookbinding apparatus relating to the present invention.

Figure 4:
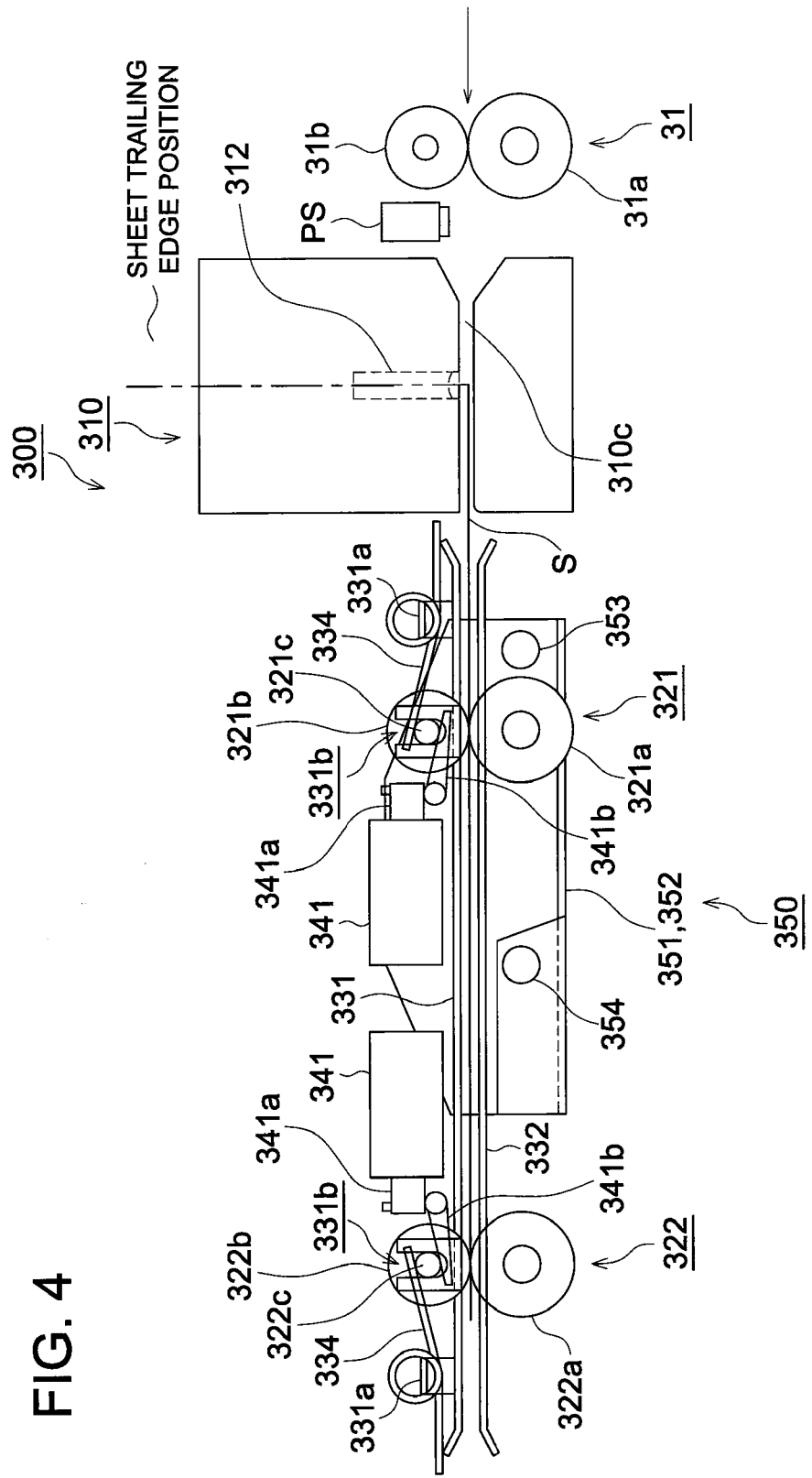

FIG. 4 is a side view of the main part showing an example of a perforation device.

Figure 5:
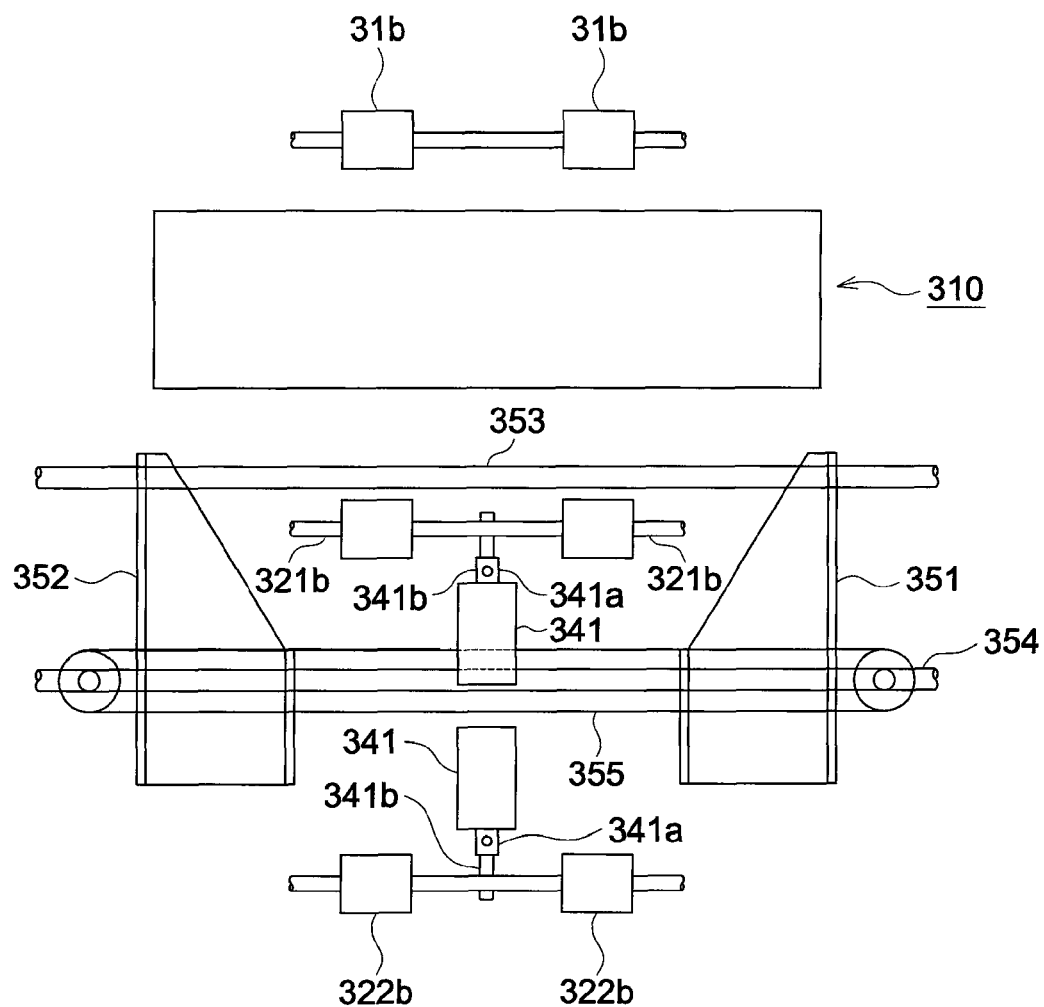

FIG. 5 is a top view of the main part showing an example of a perforation device.

Figure 6:
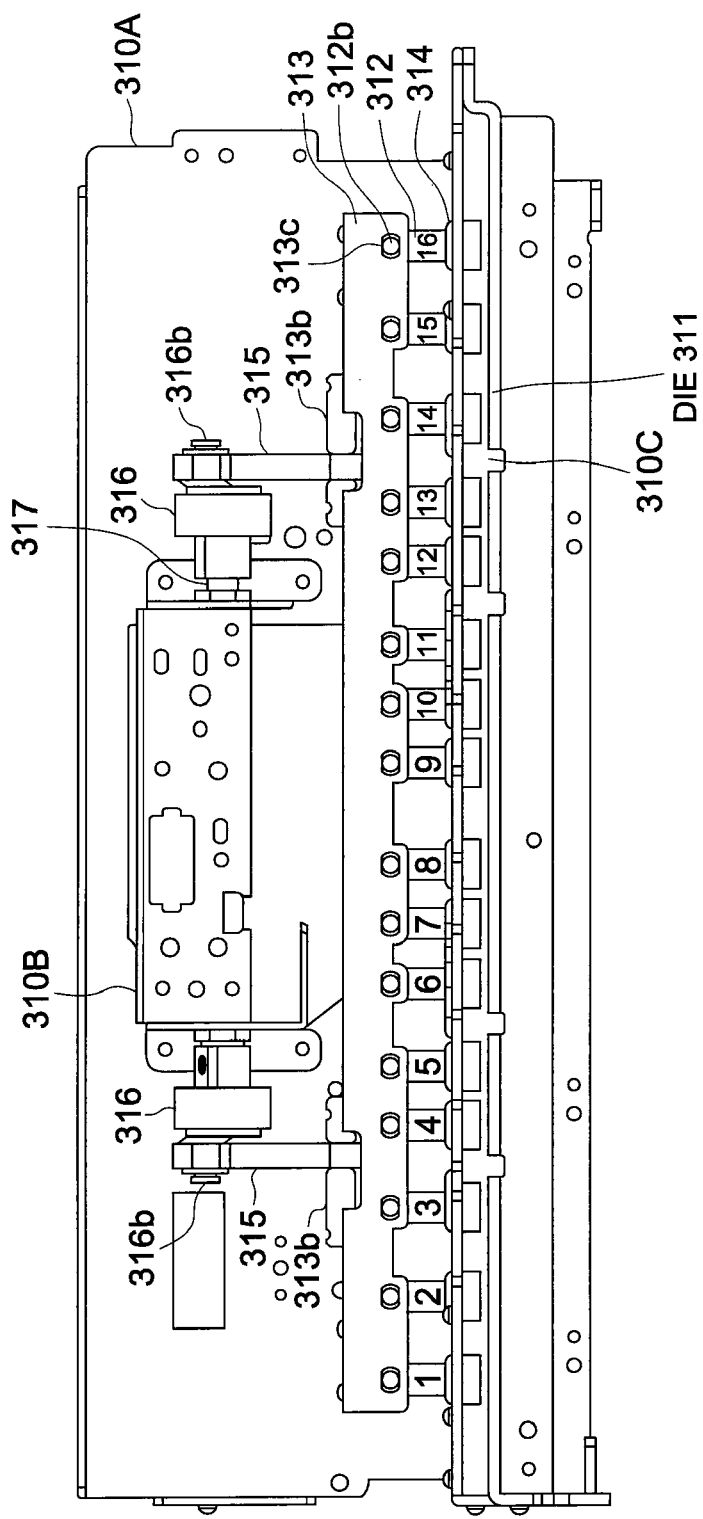

FIG. 6 is a front view of the main part showing an example of a perforation section, which punches a cut-out in a sheet.

Figure 7:
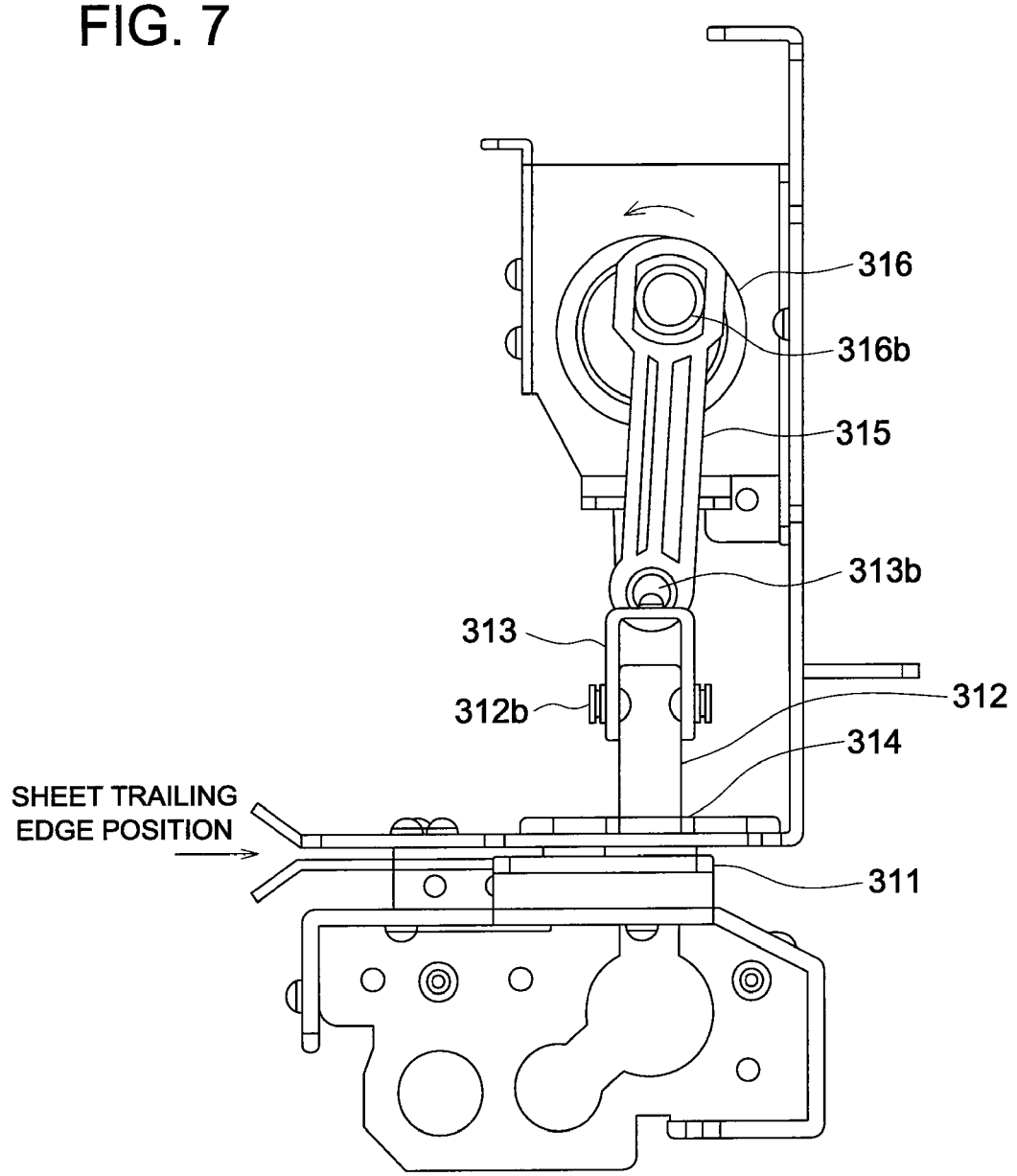

FIG. 7 is a right side view of the main part showing an example of a perforation section, which punches a cut-out in a sheet.

Figure 8:
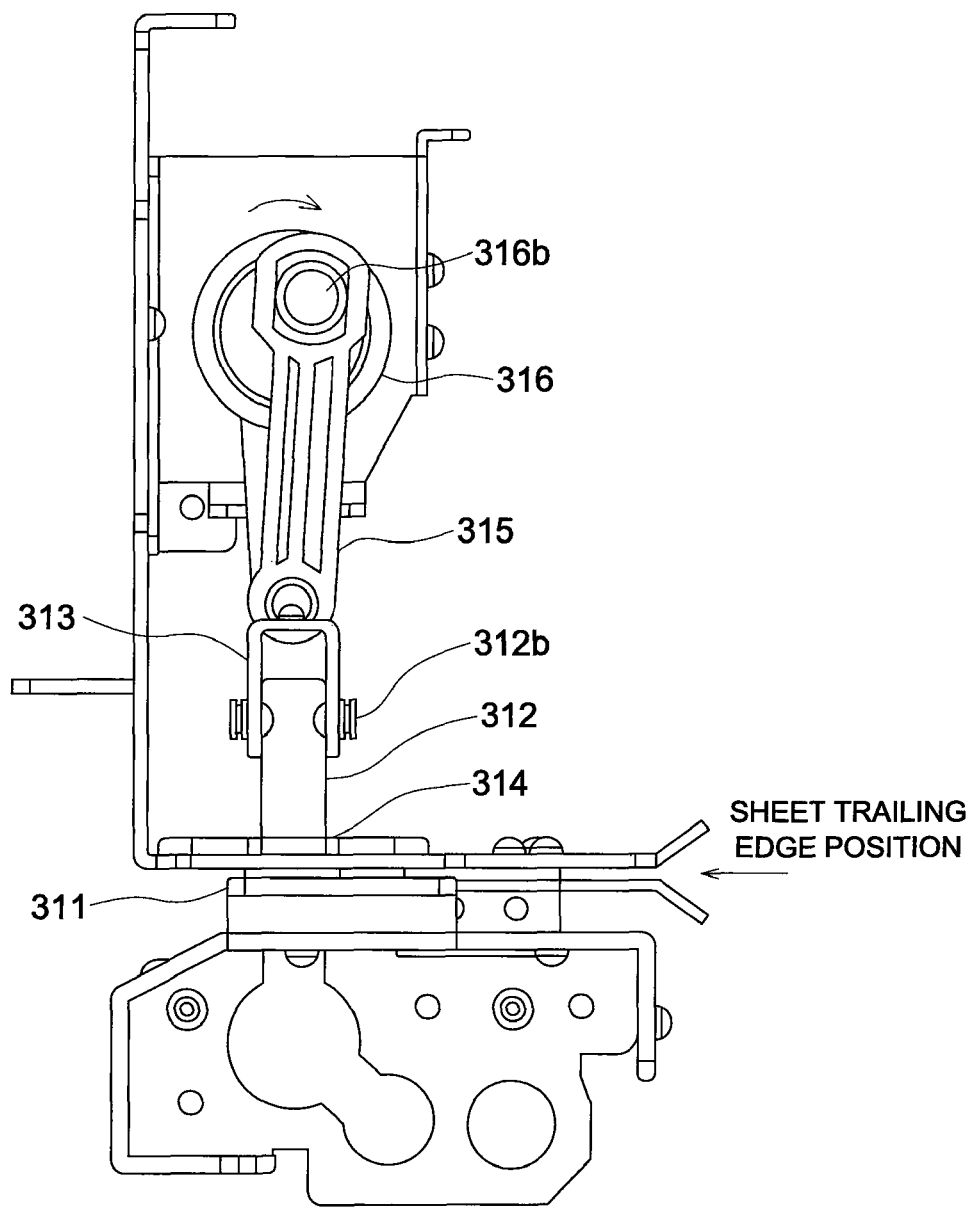

FIG. 8 is a left side view of the main part showing an example of a perforation section, which punches a cut-out in a sheet.

Figure 9:
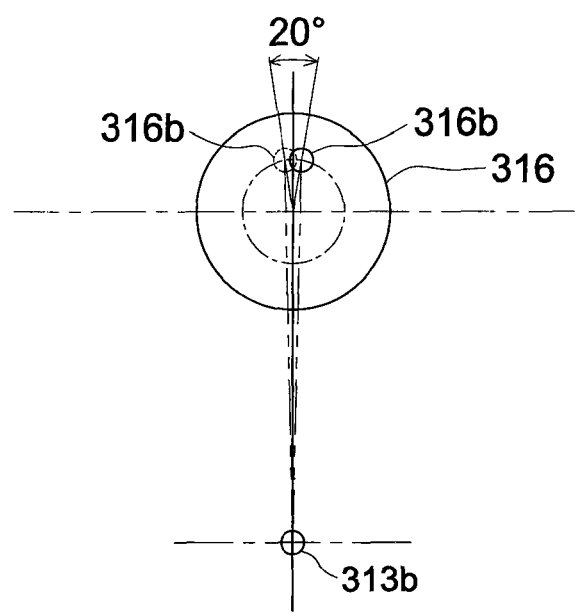

FIG. 9 is a right side view showing a position relationship among right and left cranks, in which phases of the angle are moved with each other, a crank pin, and a connecting shaft.

Figure 10:
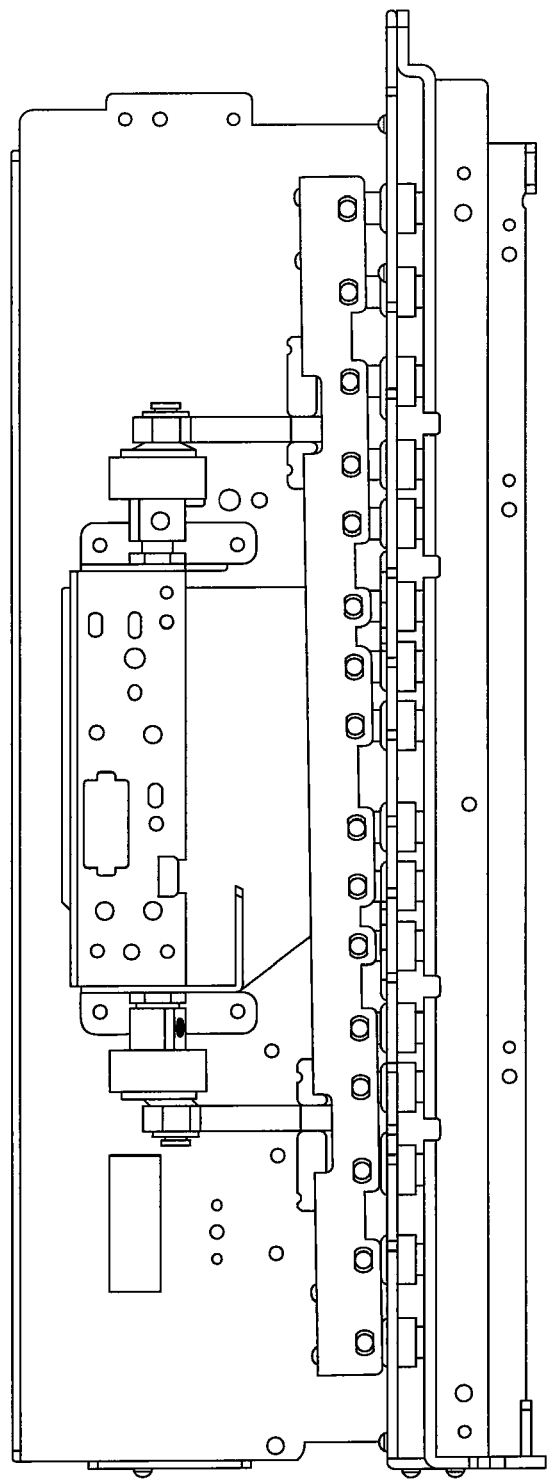

FIG. 10 is a figure showing a state that the left side punch comes down preceding the right side punch.

Figure 11:
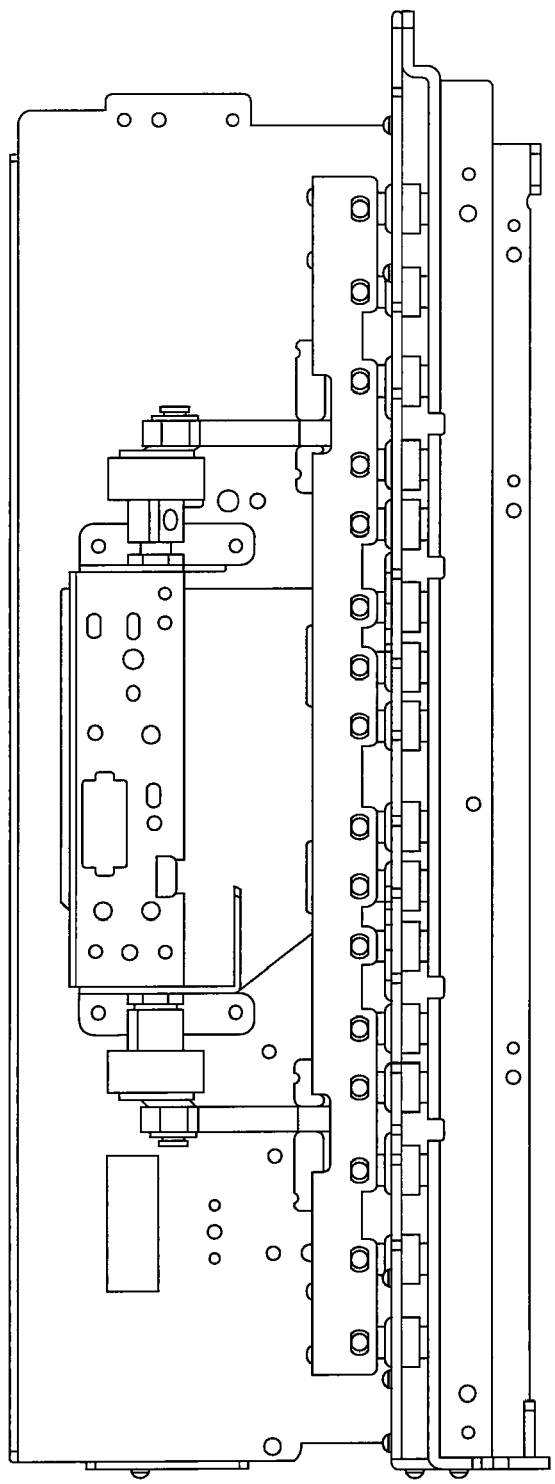

FIG. 11 is a figure showing a state that a crank rotated by 180 degree, and all punches come down to almost lowermost point position.

Figure 12:
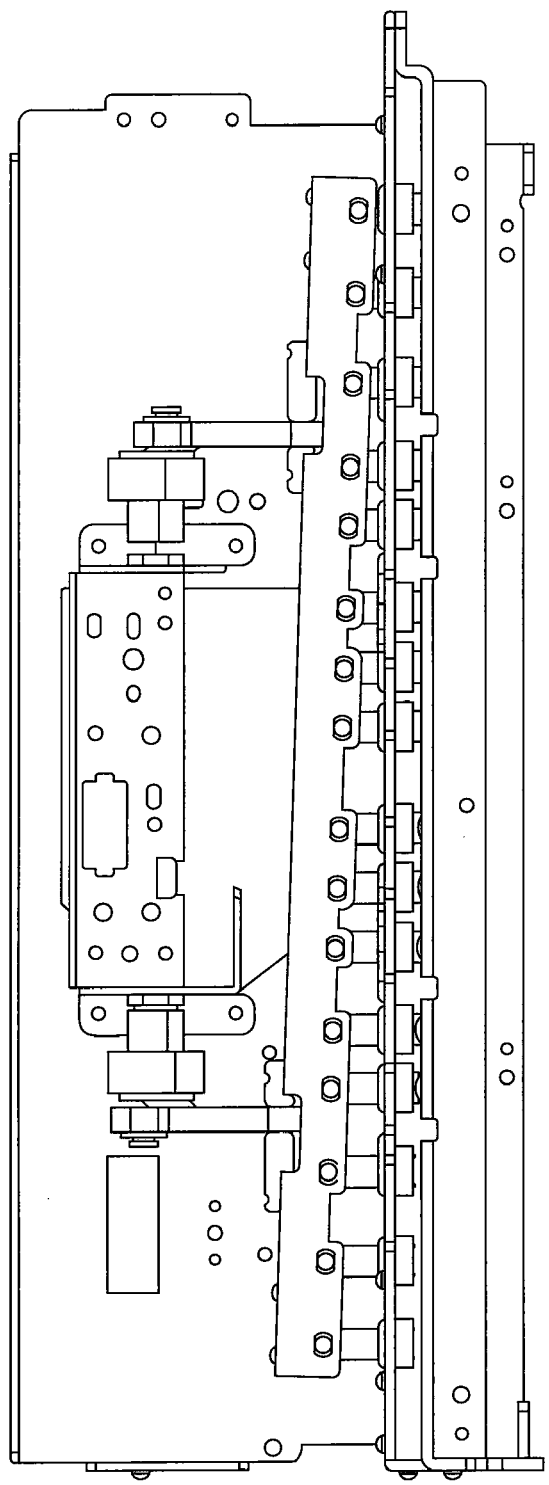

FIG. 12 is a figure showing a state that the left side punch goes up preceding the right side punch.

Figure 13:
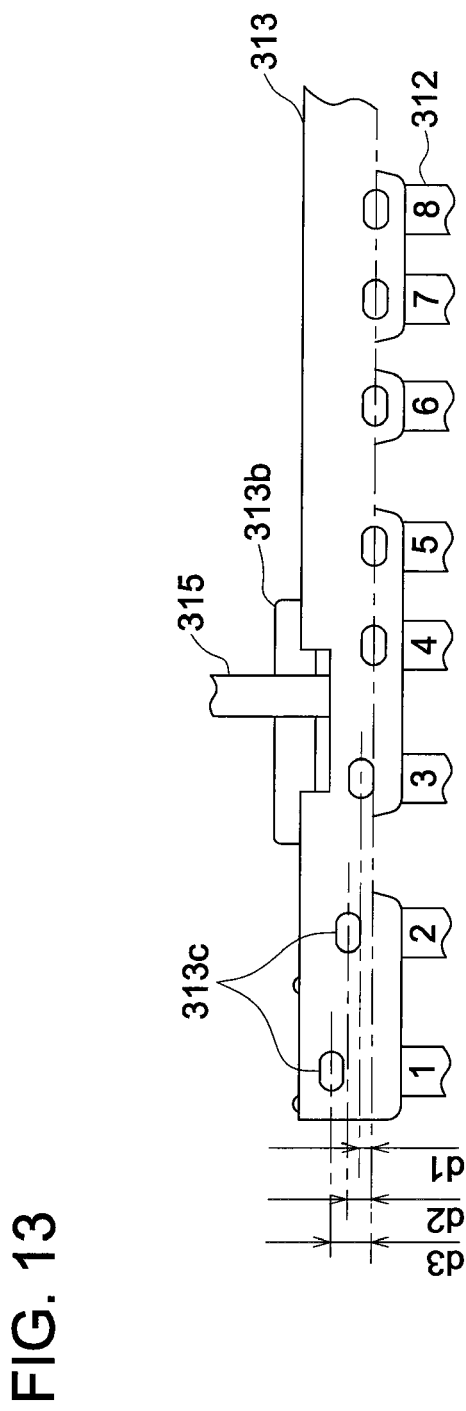

FIG. 13 is an example, in which punch installing holes of Nos. 1 to 3 are displaced in the reciprocation direction.

FIG. 14a to FIG. 19c are illustrations showing a stand-by position and lowermost point position of punches.

Figure 15A:
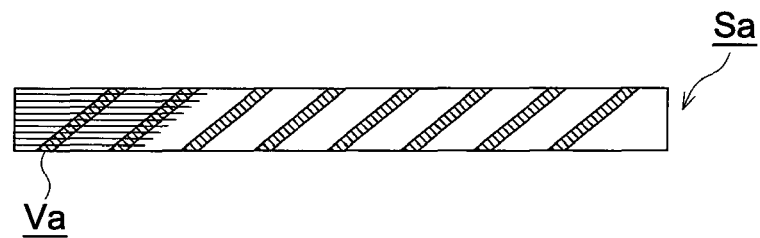
Figure 15B:
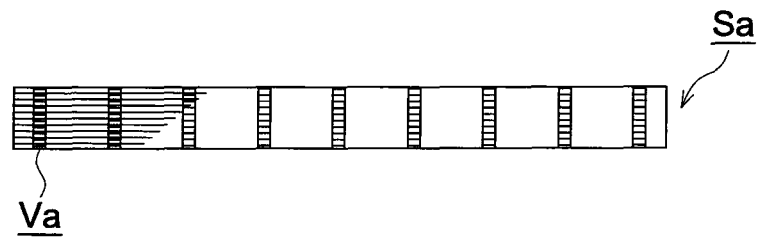

FIGS. 15a and 15b are figures showing cut-out surfaces of a sheet bundle, which is made by collection of sheets, in which cut-outs are formed.

Figure 16:
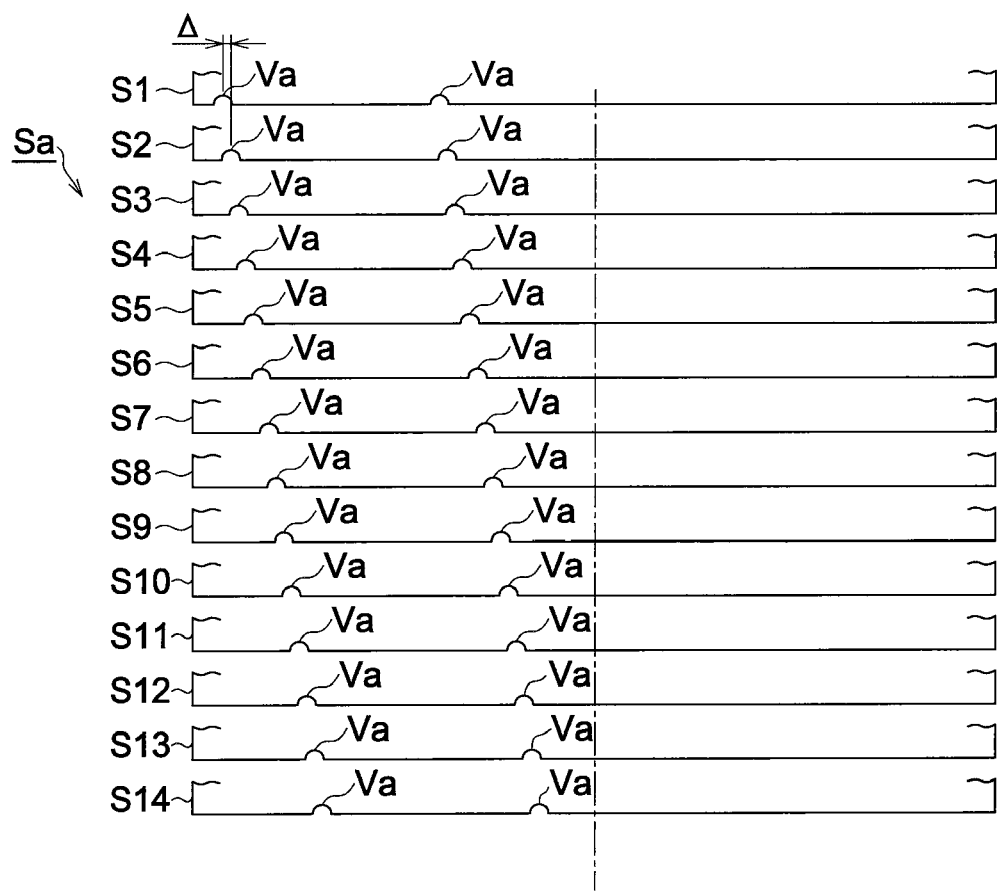

FIG. 16 is a plan of a sheet bundle, in which a plurality of sheets, in which cut-out parts were formed, were collected.

Figure 17:
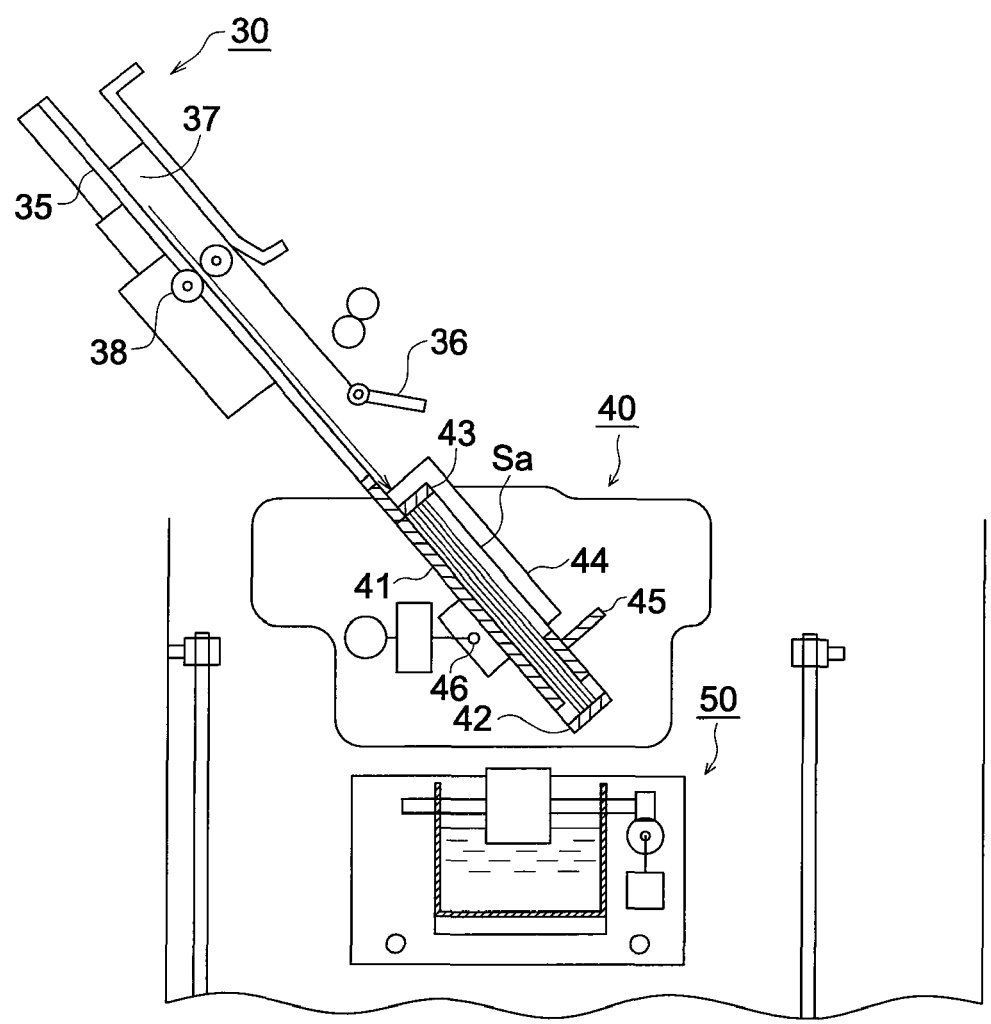

FIG. 17 is a cross section in a state that a sheet collection part of a sheet bundle storing section is obliquely arranged.

Figure 18:
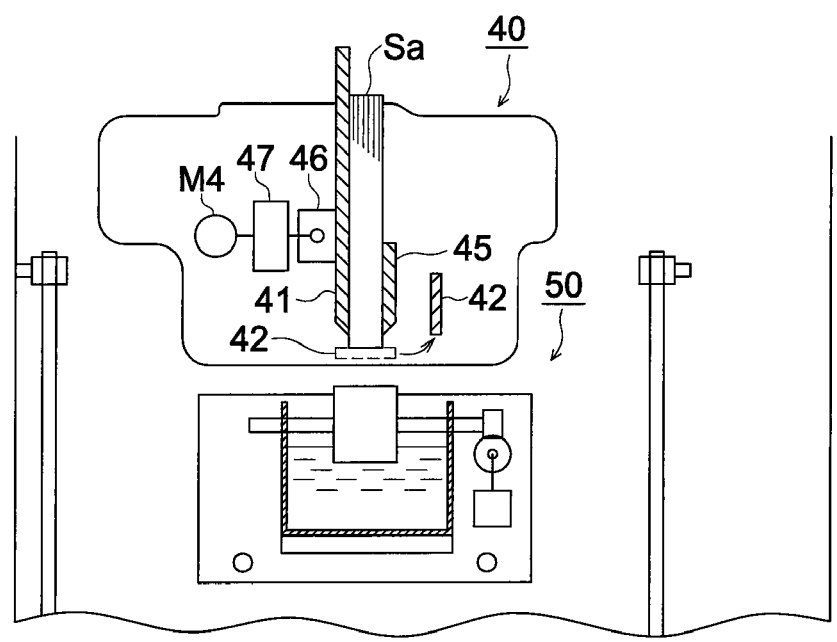

FIG. 18 is a cross section in a state that a sheet collection part of a sheet bundle storing section is vertically arranged.

Figure 19:
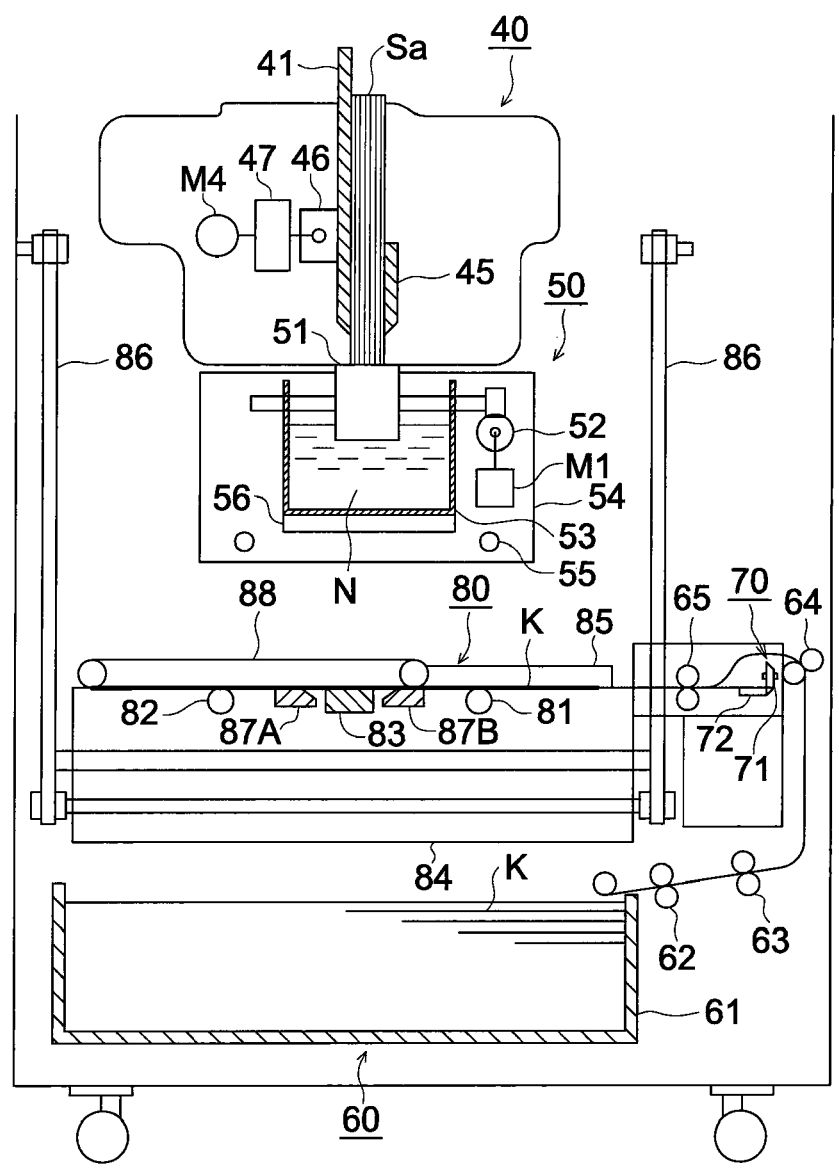

FIG. 19 is a cross section of a sheet bundle storing section, a coating section, a cover sheet supply section, a cutting section, and a booklet forming section.

Figure 20:
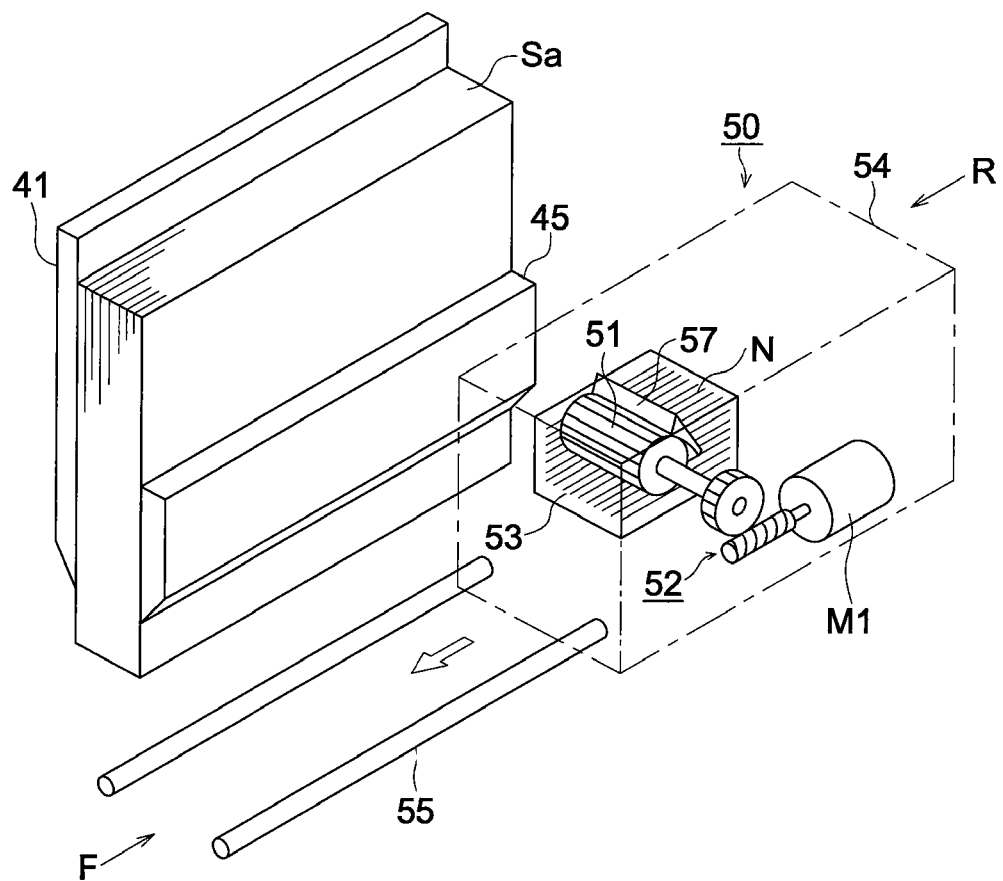

FIG. 20 is an oblique perspective figure of a coating section and a gripping section.

EMBODIMENT FOR CARRYING OUT THE INVENTION

An embodiment of the perforation device relating to the present invention, a post-processing apparatus provided with the above perforation device, and an image forming system having the above post-processing apparatus will be described with reference to figures, but the present invention is not limited to it. The above post-processing apparatus will be described with a bookbinding apparatus as an example (hereinafter, the post-processing apparatus is also referred to as a bookbinding apparatus).

FIG. 1 is an entire structural view of an image forming apparatus provided with an image forming apparatus A, a bookbinding apparatus B, a booklet storing apparatus C, and an automatic document feeding apparatus DF.

[Image Forming Apparatus A]

The image forming apparatus A has an image forming section, in which a charging unit 2, an image exposure unit 3, a developing unit 4, a transfer neutralization unit 5, and a cleaning unit 6 are arranged around a rotary image carrier 1.

In the image forming section, after the surface of the image carrier 1 is charged evenly by the charging unit 2, exposure scanning based on image data obtained from a document through reading by a laser beam of the image exposure unit 3 is conducted to form a latent image, and the aforesaid latent image is developed reversely by the developing unit 4, to form a toner image on the surface of the image carrier 1.

The sheet S fed from a sheet-storing section 7A is sent to a transfer position. At the transfer position, the toner image is transferred onto a sheet S by the transfer neutralization unit 5. After that, electric charges on the surface of the sheet S are eliminated by the transfer neutralization unit 5, and the sheet S is separated from the image carrier 1, then, conveyed by a conveyance section 7B. Successively, the sheet S is heated to be fixed by a fixing unit 8, and then ejected out of a sheet-ejection roller 7C.

When forming images on both sides of the sheet S, the sheet S subjected to heating and fixing by the fixing unit 8 is diverted from a sheet ejection path by a transportation path changeover unit 7D, then, is switchbacked in a reversing transportation section 7E to be reversed upside down, after which the sheet S is conveyed to the image forming section again so that an image is formed on the back of the sheet S, and, through the fixing unit 8, is ejected out of the sheet ejection rollers 7C. The sheet S ejected out of the sheet ejection rollers 7C is sent to the bookbinding apparatus B.

The surface of the image carrier 1 after an image was formed, in which toners remaining on the surface are removed by the cleaning unit 6, turns out to be ready for the succeeding image formation.

On top of the image forming apparatus A, an operation section 9 provided with an input unit and a display unit is arranged.

[Bookbinding Apparatus B]

As shown in FIG. 1, the bookbinding apparatus B is a case binding apparatus comprising a conveyance path 10, a sheet discharge unit 20, a reversing unit 30, a sheet bundle storing section 40, an adhesive coating section 50, a cover sheet supply section 60, a cutting unit 70, a booklet forming section 80, and a perforation device 300.

Other than the case binding apparatus, bookbinding apparatus B of the present invention can also be adopted to bookbinding apparatuses such as a side stitching apparatus, a center folding saddle stitching apparatus, and a seal binding apparatus.

FIG. 2 is a block diagram showing a control of the image forming system.

The control section of the image forming system is constituted of a main control section 100, which is arranged in image forming the apparatus A, and a post-processing control section 200, which is a control device to control a booklet production and is arranged in a bookbinding apparatus B, both of which are connected through serial communication units 101 and 201. Through instructions of the main control section 100, each part of the bookbinding apparatus B is controlled at the post-processing control section 200. The post-processing control section 200 controls drives of each part, which will be described later, to produce a booklet.

Namely, the post-processing control section 200 controls drives of a motor M4 to drive a supporting member 41, which supports a sheet bundle, the perforation device 300, the motor M1 to drive a coating roller 51, the booklet forming section 80, and the cutting unit 70.

FIG. 3 is a cross section of bookbinding apparatus B relating to the present invention.

The bookbinding apparatus B has a connecting device to connect mechanically and electrically with the image forming apparatus A.

<Conveyance Path 10>

The sheet S introduced to a conveyance path a of the conveyance path 10 of the bookbinding apparatus is conveyed with being gripped by conveyance rollers 11 and 12, after which the sheet S is diverted to either the sheet discharge unit 20 or the reversing unit 30 by a transportation path changeover unit Z1.

A transportation path changeover unit Z2, which is arranged upstream in the sheet conveyance direction of the conveyance roller 11, diverts the sheet S discharged from image forming the apparatus A to either the conveyance path a or a conveyance path b. The sheet S, which is conveyed to the conveyance path b, is sent to the booklet forming section 80 with being gripped by conveyance rollers 14.

<Sheet Discharge Unit 20>

When a sheet discharge to the sheet discharge unit 20 is set, the transportation path changeover unit Z1 intercepts a conveyance path c to the sheet bundle storing section 40, and opens a conveyance path d to the sheet discharge unit 20.

The sheet S, which passes through the conveyance path d to the sheet discharge unit 20, is conveyed upward with being gripped by conveyance rollers 21, and discharged by discharge rollers 22 on a fixed sheet discharge tray 23 located on top of the apparatus to be stored in it.

<Perforation Device 300>

The sheet 5, which was diverted to the conveyance path c by the transportation path changeover unit Z1, is conveyed to the perforation device 300 with being gripped by conveyance rollers 31 comprising a drive roller 31a and a driven roller 31b.

FIG. 4 is a side view of the main part showing an example of the perforation device 300, and FIG. 5 is a top view of the perforation device 300.

In the mode of the present embodiment, the perforation device 300 punches a hole so that a hole is overlapped with an edge part of a sheet at rear end portion of the sheet S, to form a semilunar cut-out at rear end portion of the sheet.

Each of conveyance rollers 321 and 322 is comprised of drive rollers 321a and 322a, and driven rollers 321b and 322b, all of which are capable of pressure bonding and release of the pressure bonding, and the drive rollers 321a and 322a are driven by a motor (not illustrated). Further, an upper guiding board 331 and a lower guiding board 332 are arranged so that the sheet S is securely guided and conveyed by the conveyance rollers 321 and 322. Since a torsion coil spring 334 is attached by engaging to a spring hooking part 331a, and one end of the torsion coil spring 334 presses shafts 321c and 322c of the driven rollers 321b and 322b, the driven rollers 321b and 322b is attached with pressure onto the drive roller 321a and 322a. In addition, since the driven rollers 321b and 322b are configured so that they are capable of moving upward with pressure bonding to the drive roller 321a and 322a being released, a guiding part 331b to the guide shafts 321c and 322c is arranged at the upper guiding board 331.

The torsion coil spring 334, which is attached with pressure onto the driven rollers 321b and 322b, is not limited to it, and, for example, a helical extension spring, a compression coil spring, and a plate spring are usable.

Above of the upper guiding board 331, two solenoids 341 are arranged, and, between each of the solenoids 341 and each of the driven rollers 321b and 322b, each of crank levers 341b is arranged. And it is configured that one end of the crank lever 341b is engaged with a plunger 341a of the solenoid 341, and the other end of the crank lever 341b is capable of pressing upward the lower parts of the shafts 321c and 322c of the driven rollers 321b and 322b.

There is also arranged an aligning device 350, which aligns in the width direction of the sheets S by pressing both end parts of the sheet S, which were conveyed to positions of the conveyance rollers 321 and 322, from width direction being perpendicular to a sheet conveying direction toward the center. Each of the aligning device 350 is provided with each of lateral alignment boards 351 and 352. The lateral alignment boards 351 and 352 are movable in the width direction and in the opposite directions each other by a belt 355 driven by a stepping motor (not illustrated), and are supported by shafts 353 and 354.

FIG. 6, FIG. 7, and FIG. 8 are a front view, a right side view, and a left side view, respectively, of the main part showing an example of a perforation section 310, which punches a cut-out in the sheet S. FIGS. 6, 7, and 8 show a state that a punch 312, to be described later, is at an initial position (a stand-by position).

Hereinafter, the left side (one end) and the right side (the other end) are referred to as the front side and the back side of the bookbinding apparatus B, respectively.

The perforation section 310 is provided with the plurality of punches 312 to punch cut-outs on the sheet S by a reciprocation motion; dies 311 being arranged opposing to the plurality of punches 312, and fit to reciprocating the punches 312; a holding board 313 to hold the plurality of punches 312 in the width direction of the sheet S; and a drive section to reciprocates the punches 312, all of which are arranged at a sheet conveyance path 310C. In the present embodiment, 16 pairs of the punch 312 and the die 311 are provided. Hereinafter, punches are referred to as the first punch 312, the second punch 312, and the hie, in the order from the left punch 312 to the right direction.

The outer surface of the punch 312 reciprocatably fits to the internal surface of a guiding member 314.

The holding board 313 holds the punch 312 by fitting a punch mounting hole 313c arranged at the holding board 313, and a fixing shaft 312b arranged at the punch 312 tightly together.

At the right position and the left position, by which positions the sheet conveyance center of the holding board 313 is sandwiched, two connecting shafts 313b are arranged, each of which shafts is rotatably connected to an end of each of two coupling rods 315.

The drive section has a drive shaft 317, which is rotatably driven by a motor (not illustrated) as a driving device, and two cranks 316, which are provided with a crank pin 316b arranged at a position displaced from a rotation center, and fixed at both ends of the drive shaft 317. Each of two cranks 316 is fixed at a position opposing to two connecting shafts 313b arranged right and left at the both ends of the drive shaft 317.

The drive shaft 317 is supported by, for example, a supporting board 310B, and the supporting board 310B is fixed to a perforation section base 310A. The crank pin 316b is rotatably connected to the other end of a coupling rod 315.

As described above, two sets of the crank 316, the coupling rod 315, and the holding board 313 constitute the so-called a slider-crank mechanism. With this mechanism, the rotation of the drive shaft is, through the crank 316 and the coupling rod 315, transferred to the holding board 313, whereby the holding board 313 reciprocates. At the same time, the punch 312 held by the holding board 313 reciprocates, whereby cut-outs on the sheet S are punched.

In the upstream of the punch 312 in the sheet conveyance direction, a sensor PS to detect the sheet S is arranged.

In the above-described perforation, in case where, as described above, a plurality of punches are pushed down at the same time to punch holes in a sheet at a time, a large force is required during perforation. Further, there was a problem that, during perforation at a time on a surface at an edge side, a force working in the direction of a sheet moving away increases, whereby a formation of cut-outs exhibiting an excellent shape and accuracy in position became difficult.

Coping with the above problem, the right and left cranks 316 of the drive shaft 317 are at positions where phases of angle (an angle phase) in the shaft rotating direction of the crank pins 316b are displaced with each other.

FIG. 9 is a figure, viewed from a right side, showing a position relationship among the right and left crank pins 316b, and the connection shaft 313b, at the initial position (a stand-by position) of the right and left cranks 316, in which angle phases were displaced. As shown in FIG. 9, in the present embodiment, the angle phase is displaced by 20 degree. In FIG. 9, the positions of the crank pins 316b shown by a solid line and a broken line indicate the right side crank 316 and the left side crank 316, respectively. As shown in the figure, two of the right and left side cranks 316 constitute a differential crank, in which angle phases are displaced.

FIGS. 7 and 8 are side views in a state that the crank pin 316b is located at a position shown by FIG. 9.

Next, the perforation action of the present invention will be described.

FIGS. 10, 11 and 12 are figures showing each state of the perforation action, and since reference numerals at each section are the same as those of FIG. 6, they are omitted.

When the drive shaft is allowed to be driven to rotate by a motor in the direction of arrows indicated in FIGS. 7 and 8 from the stand-by position as shown in FIGS. 6, 7 and 8, the right and left cranks 316 also rotate in the direction of arrows. Since the right and left side cranks 316 are made to be differential cranks, the left side crank 316 pushes down the coupling rod 315 in advance of the right side crank 316. With this motion, the left side of the holding board 313 descends in advance of the right side. Namely, the punches 312 in the left side descend. At this time, the holding board 313 reciprocates in a state of the right and the left phases being displaced.

Further, with the rotation of the crank 316, punch blades of the punches 312 reach the sheet S successively from a punch blade of the punch 312 on the leftmost side, and starts punching of a cut-out.

FIG. 10 is a figure showing a state that the left side punch 312 descends in advance of the right side punch 312.

When the crank 316 further rotates, the punches 312 positioned in the right side direction successively reach the sheet S, and punching of a cut-out is successively carried out. Namely, the differential perforation having a time difference of perforation for each of the punches 316 is carried out. When the crank rotates by 180 degree, the whole punches 316 become a state that they are positioned at almost lowest point with being fitted to the dies 311. At this time, the holding board 313 becomes parallel to the dies 311 and the sheet S.

FIG. 11 is a figure showing a state that the cranks rotated by 180 degree and the whole punches 316 fell to a position of almost lowest point.

When the crank 316 further rotates, the punches 316 successively ascend from the left side punch 316, fitting between the whole punches 312 and dies 311 are released, and then, the whole punches 312 are refracted from sheet the conveyance path 310C.

FIG. 12 is a figure showing a state that the left side punches 312 ascend in advance of the right side punches 312.

When the crank 315 rotates by 360 degree, the perforation section becomes a stand-by state as shown in FIG. 6.

In the present embodiment, the rotation direction of the crank 316 was set to the direction of arrows described in FIGS. 7 and 8, but the rotation may be reversed. In that case, right and left described above become reversed. Namely, the perforation starts from the right side punch 312.

As described above, in the present invention, using a differential crank, the holding board 313 is allowed to reciprocate in a state of the right and the left phases being displaced. For this reason, corresponding to descend of the holding board 313, the punches 316 descent successively from the left one, whereby a differential perforation, in which cut-outs are punched with a time difference successively from the left one, is carried out. With this, increase in force during perforation, and increase in force working in the direction of a sheet moving away can be reduced, whereby improvement of accuracy in shape and position of cut-outs can be achieved.

Further, since it is not necessary to displace positions where punches are installed due to the perforation being made to be a differential perforation using differential cranks, even if the number of punch becomes large, the punch 312, that is, a stroke S of a reciprocation motion of the holding board 313 is not required to be made longer, whereby the perforation device 310 can be made compact, and consequently, it is possible to prevent the apparatus getting larger.

When, using a differential crank, the holding board 313 is allowed to reciprocate in a state of right and left phases being displaced, the lowermost point position of the punch 312 differs between the side of sheet conveyance center (a center of holding board 313) and the right and left outside directions. Namely, as the punch 312 moves away to the outside direction to the right and left flour punches of No. 8 and No. 9, the lowermost point position of the punch 312 is lowered. The lowermost point position of punches of No. 1 and No. 16 is most lowered compared to punches of No. 8 and No. 9.

As described above, it is preferable that the stroke S of a reciprocation motion is made small in order to make the perforation section 310 compact. To achieve it, it is effective that variation of the lowermost point position of the punch 312 is made small, namely, the lowermost point position of each of the punches 312 is made within a prescribed range.

Making the lowermost point position within a prescribed range can be achieved by displacing, within the differential perforation is maintained, holding positions of a reciprocation motion of the prescribed punches 312 among the punches 312 held by the holding board 313, namely, the punch mounting hole 313c.

FIG. 13 is an example of the punch mounting holes 313c of Nos. 1 to 3 being displaced in the direction of a reciprocation motion. The distances of d1 to d3 indicate an amount of displacement. In FIG. 13, the above amount of displacement is drawn in an exaggerated way to make it more visible.

The number of punches 312, whose position of the punch mounting holes 313c is displaced, and each amount of displacement are appropriately set based on the number of the punch 312, a size of the apparatus, specifications, and the like.

With this, the stroke S of the reciprocation motion can be made smaller, resulting in the perforation section 310 being more compact.

Figure 14C:
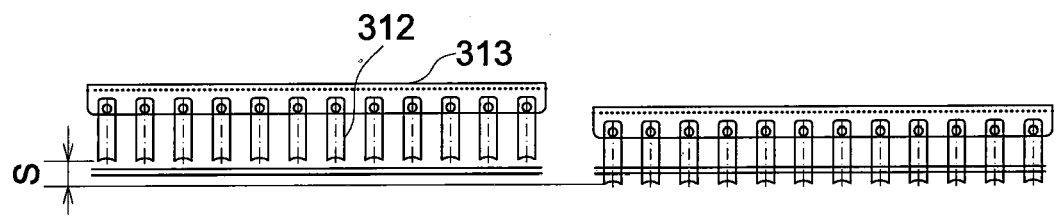

FIG. 14c is an illustration showing a stand-by position and a lowermost point position of punches in the perforation device 300 of the present invention. As shown in the figure, the stroke S of the reciprocation motion of FIG. 14c can be made small compared to those of FIGS. 14a and 14b.

Next, the control of the perforation device 300 will be described.

In FIGS. 1 and 2, when a book binding process is selected at the operation section 9 of the image forming apparatus A, the sheet S, which was ejected from the sheet-ejection roller 7C of the image forming apparatus A, is diverted to the conveyance path c, and then, conveyed to the perforation device 300 by the conveyance rollers 31.

Subsequently, an edge of the sheet S is conveyed to a position between the upper guiding board 331 and the lower guiding board 332 by the conveyance rollers 321 and 322. When the sensor PS detects a trailing edge of the sheet S, a timer (not illustrated) of a control device begins to operate, and after the elapse of a prescribed time, the control device stops a drive of a motor (not illustrated) for a sheet conveyance, to stop rotation of the conveyance rollers 321 and 322. With this action, the sheet S stops at a prescribed punching position. The above control device is not limited to the timer, but, for example, the rotation of the conveyance rollers 321 and 322 may be stopped by detecting the number of rotation of the conveyance rollers 321 using a pulse counter or the like, which detects the number of rotations of the conveyance rollers 321.

Next, when it becomes a state shown in FIG. 4 after the termination of rotation of the conveyance rollers 321 and 322, two solenoids 341 are energized, and each of the plungers 341a is drawn into the solenoid 341. Then, both of the crank levers 341b turn, and an end of the crank lever 341b pushes lower parts of the shafts 321c and 322c of the driven rollers 321b and 322b upward against the urging force of the torsion coil springs 334, to eliminate pressure bonding to the drive rollers 321a and 322a by the driven rollers 321b and 322b.

When pressure bonding to drive the rollers 321a and 322a by the driven rollers 321b and 322b is released, gripping of the sheet S by each of rollers is released. Then, lateral alignment of the sheets S is carried out by allowing the belt 355 to rotate by driving a stepping motor (not illustrated), to move the lateral alignment boards 351 and 352 toward the center direction, and to press the both end parts of the sheet S.

After completion of the lateral alignment of the sheets S, the belt 355 is reversely rotated by driving the stepping motor (not illustrated) in the opposite direction of the rotation of the lateral alignment, to move the lateral alignment boards 351 and 352 toward the outside direction, whereby the lateral alignment boards 351 and 352 are made to be separated from the both end parts of the sheet S.

Next, power distribution to two solenoids 341 is stopped. Then, each of the plungers 341a is projected to retract an end of the crank lever 341 downward from lower parts of the shafts 321c and 322c of the driving rollers 321b and 322b. With this action, the driven rollers 321b and 322b again press the drive rollers 321a and 322a by urging force of the torsion coil spring 334. Namely, the sheet S is again gripped by each of rollers.

Next, by reciprocating the punch 321, cut-outs are formed on edge of the rear end of the sheet S.

As described above, during punching cut-outs, by gripping the sheet S by allowing the conveyance rollers 321 and 322 in a state of pressing, it is possible to restrain the sheet S moving away during perforation. Since, in particular, in formation of a cut-out such as a semilunar cut-out, a V-shaped cut-out, and a U-shaped cut-out, compared to formation of a circular hole cut-out, a force working in the direction of a sheet moving away is generated, the above force of moving away can be restraint, whereby improvement of accuracy in position of cut-outs can be achieved.

FIG. 15 is a figure showing cut-out surfaces of a sheet bundle, which is made by collection of sheets S, in which cut-outs Va are formed. FIG. 16a is a figure when the cut-outs Va are formed by each of the cut-outs Va being shifted by each of the sheet S, and FIG. 16b is a figure when the cut-outs Va are formed at the same positions of the whole sheets S.

FIG. 16 is a plan of a sheet bundle Sa, which is made by collection of the plurality of sheets S (S1 to S14), in which each of the cut-outs Va is displaced by each of the sheets S, and shows a figure of two cut-outs as an example. The shift of each of the cut-outs Va by each of sheets S is carried out by moving the perforation section 310 in the right and left directions using a moving device (not illustrated).

The shifts of cut-outs Va by each of the sheets S may be achieved by arranging a moving device, which moves the conveyance rollers 321 and 322 in a sheet width direction perpendicular to a sheet conveyance direction, and moving the sheets S, which are gripped together with the conveyance rollers 321 and 322, by the prescribed distance, in a sheet width direction perpendicular to a sheet conveyance direction.

According to the above description, using two cranks, in which phases of the angle are moved with each other, and by reciprocating the holding board in a state the right phase and the left phase being displaced with each other, a differential perforation is carried out, in which punches come down step by step in an order from one side to the other side corresponding to a descent of the holding board, and then cut-outs are punched with time difference in an order from one end. With this, increase in force during perforation, and increase in force working in the direction of a sheet moving away can be reduced, whereby improvement of accuracy in shape and position of cut-outs can be achieved.

Further, since it is not necessary to displace positions where punches are installed due to the perforation being made to be a differential perforation using differential cranks, even if the number of punch becomes large, the punch, that is, the stroke S of a reciprocation motion of the holding board is not required to be made longer, whereby the perforation device can be made compact.

<Reversing Unit 30>

The sheets S, in which cut-outs were formed at a perforation mechanism 311, are stored in the prescribed position of the reversing unit 30 with being gripped by conveyance rollers 32, 33, and 34. The reversing unit 30 is equipped with a sheet placement table 35 being obliquely arranged; a swingable positioning member 36 to position a sheet rear end; an aligning member 37 to align the sheets S in a sheet width direction; conveyance rollers 38, and the like.

<Sheet Bundle Storing Section 40>

FIG. 17 is a cross section in a state that a sheet collection part of the sheet bundle storing section 40 is obliquely arranged.

The sheet bundle storing section 40 is equipped with the supporting member 41, a receiving plate 42, a lateral aligning member 44, a pressing member 45, and the like.

The sheet S placed on the sheet placement table 35 of the reversing unit 30 is gripped by the conveyance rollers 38, and ejected from an opening having been left open by a swing of the positioning member 36 to position a sheet rear end, and then, conveyed obliquely downward. The sheets S are successively stored in the sheet bundle storing section 40 to be collected.

The sheet bundle storing section 40 is equipped with the supporting member 41 having an obliquely arranged collection surface, and the swingable receiving plate 42. The sheet S descended from the reversing unit 30 slides down the collection surface of the obliquely arranged supporting member 41, stops with the tip of the sheet S making a close contact with the receiving member 42, and then, obliquely supported.

A lengthwise aligning member 43 carries out a lengthwise alignment in order to align the tips of the sheets S in a manner that the lengthwise aligning member 43 pushes rear ends of the sheets S to make the tips of the sheets S a close contact with the receiving member 42, corresponding to a size of the sheet S, which is placed on the collection surface of the supporting member 41.

The sheets S, which are successively ejected from the image forming apparatus A, are conveyed by a switchback mechanism in the reversing unit 30, and collected in the sheet bundle storing section 40. Then, lengthwise alignment and lateral alignment, to be described later, of the collected sheets are carried out, whereby the sheet bundle Sa composed of the plurality of sheets S is formed.

The size of the sheet S and the number of sheets of the sheet bundle Sa representing setting conditions of the booklet are set by the operating section 9 of the image forming apparatus A shown in FIG. 1, or by an external equipment such as a personal computer connected with the image forming apparatus A.

The lateral aligning member 44 carries out a lateral alignment in the sheet width direction by pressing the side edges of the sheets S conveyed form the reversing unit 30 and stored in the sheet bundle storing section 40, when an online system performing from an image formation to a book binding process is in a startup status.

When an offline system, in which the book binding process is performed independently, was started, power distribution to the lateral aligning member 44 is stopped, and the width direction of the sheet bundle stored in the sheet bundle storing section 40 from outside is aligned by a manual operation of the lateral aligning member 44.

The pressing member 45 presses the sheet bundle Sa collected in the sheet bundle storing section 40 in a thickness direction to grip them. At a step where the prescribed number of the sheets S are stored in the sheet bundle storing section 40, the pressing member 45 is operated by a drive section (not illustrated), whereby the sheet bundle Sa is gripped by a gripping section, which is composed of the supporting member 41 and the pressing member 45.

FIG. 18 is a cross section in a state that a sheet collection part of the sheet bundle storing section 40 is vertically arranged.

The supporting member 41 and the pressing member 45 holding the sheet bundle Sa rotate centering around a shaft 46 of the sheet bundle storing section 40 by the motor M4 and a drive section 47 to make the sheet bundle Sa in a vertical state from an oblique state. In this state, the coating section 50 is retracted downward and a bottom surface of the sheet bundle Sa is detached from the coating roller 51 of the coating section 50.

Also, in a state where the supporting member 41 and the pressing member 45 hold the sheet bundle Sa, the receiving plate 42 moves from a broken line position to a solid line position in the figure by being rotated by the drive section (not illustrated).

<Coating Section 50>

FIG. 19 is a cross section of the sheet bundle storing section 40, the coating section 50, the cover sheet supply section 60, the cutting section 70, and the booklet forming section 80.

The coating section 50 is provided with the coating roller 51; a drive section 52 to rotary drive the aforesaid coating roller 51; a container 53 to contain an adhesive N such as glue; a moving body 54 to support the container 53 and is movable from an initial position at a back side of the bookbinding apparatus B to a coating position at a front side; a moving unit 55 to reciprocate the moving body 54; a heating unit 56 to heat the adhesive N contained in the container 53; and the like.

<Coating of Adhesive to Sheet Bundle>

The moving body 54 in the coating section 50 is moved in a direction parallel to a longitudinal direction of the bottom surface of the sheet bundle Sa held upright by gripping section composed of the supporting member 41 and the pressing member 45.

The moving body 54 starts to move from the initial position at the back side of the bookbinding apparatus B, and moves along the moving unit 55, then stops at a predetermined position at a front side of the bookbinding apparatus B, after which returned to the initial position by a reversing drive.

FIG. 20 is an oblique perspective figure of the coating section 50 and the gripping section.

The coating roller 51, which is immersed in the adhesive N contained in the adhesive container 53, is rotated by the motor M1 and the drive section 52. The coating roller 51 applies, by a forward spoke or reciprocation of the moving body 54, the adhesive N from a back side R toward a front side F in the longitudinal direction on the bottom surface of the sheet bundle Sa being held upright.

<Cover Sheet Supply Section 60>

As shown in FIG. 19, a cover K, which is a cover sheet stored in a cover sheet loading section 61 of the cover sheet supply section 60, is separated and fed by a sheet feeding section 62, and conveyed to the booklet forming section 80 by being gripped by conveyance rollers 63, 64 and 65.

<Cutting Section 70>

The cutting section 70, which is configured integrally on the right side of the booklet forming apparatus 80 in the figure, which apparatus is located above the cover sheet supply section 60 in the figure, cuts the cover K in a predetermined length in the feeding direction with a rotary cutter configured with a rotation blade 71 and a fixed blade 72.

The prescribed length is the sum of a length of two sheets in traveling direction of the sheet S and a length of the spine of the sheet bundle Sa. For example, in case of processing a case binding, where the cover K is bonded onto a spine of the sheet bundle Sa composed of the sheets S in A4 size, supposing that the maximum number of sheet in the sheet bundle Sa is 300 and its thickness is about 30 mm, the prescribed length is set to be 450 mm, which is the sum of a length of two times of 210 mm, which is a length of a short side of the A4 sheet, and a thickness 30 mm of the sheet bundle Sa, and the edges of the cover K is cut in the above length. The wide-size of at least 450 mm is used for the total length of the cover K prior to being cut.

Also in case of producing a booklet Sb by a case binding processing with each of the sheets S of a A5 size, a B5 size, and a size of 8.5×11 inches (a inch is 25.4 mm), the prescribed length is set based on the short side length of the sheet and the thickness of the sheet bundle.

In the control section 9 of the image forming apparatus A or an external equipment, when a sheet size, a number of sheets, and a thickness of a sheet are set or detected, the control section sets a prescribed cutting length of the cover K. The length of the cover K prior to being cut is determined in accordance with a maximum number of the sheets and stored in the cover sheet loading section 61 of the cover sheet supply section 60.

<Booklet Forming Section 80>

The booklet forming section 80 is provided with conveyance rollers 81 and 82 to stop the cover K supplied from the cover sheet supply section 60 at a prescribed position after the cover K being received and conveyed; a pressure member 83 to attach the cover K with pressure on an adhesive application surface of the sheet bundle Sa; a movable housing 84 to support the conveyance rollers 81 and 82, the pressure member 83; and an elevating section 86 to enable an aligning section 85 and the movable housing 84 to move up and down vertically; and the like.

The booklet forming section 80 and a booklet ejection belt 88 move up and down in an integrated manner by the elevating section 86.

When the booklet forming section 80 stops at a descended position to introduce the cover K, the aligning section 85 moves in accordance with the size of the cover K from an initial position, and presses the both side surfaces in the width direction of the cover K prior to being cut to perform a lateral alignment. The cover K having been subject to a lateral alignment to correct a skew is switched back in a direction opposite to an introducing direction, and conveyed to the cutting section 70 to be cut at a prescribed position.

Also, before the booklet forming section 80 bonds the cover K having been cut onto the spine of the sheet bundle Sa at the descended position, the aligning section 85 again moves from the initial position, and performs a lateral alignment by pressing both side surfaces of the cover K in the width direction, after which stops the cover K at a prescribed position. Thereafter, the aligning section 85 returns to the initial position so that the aligning section 85 does not interfere bonding of the cover K and the sheet bundle Sa, then subsequently, the booklet forming section 80 ascends. While climbing upward, the cover K is supported at a prescribed position.

Therefore, the aligning section 85 disposed at the booklet forming section 80, which is capable of moving up and down, aligns a position of the cover K in the cover sheet width direction before and after the cutting section 70 cuts the cover sheet, thereby accuracy enhancement in cover sheet cutting and in an alignment of the sheet bundle Sa and the cover K, and simplification of the structure can be attained.

The elevating section 86 moves the moving housing 84 upward by rotating the left and right belts. At the ascended position, a center portion of the cover K placed on the pressure member 83 is brought in pressure contact with the adhesive N application surface of the sheet bundle Sa to be bonded. A part of the adhesive N applied by the above pressure contact goes around the side edges of the front and back surfaces of the sheet bundle Sa. After application of the adhesive onto the sheet bundle Sa, the coating section 50 moves backward to be retracted.

<Front Cover Folding Processing>

At an upper part of the booklet forming section 80, a coversheet folding section is arranged. The coversheet folding section has a pair of bilaterally symmetric forming members 87A and 87B. The forming members 87A and 87B are attachable and detachable in a thickness direction of the sheet bundle Sa. The forming members 87A and 87B fold the cover K along a side edge of the adhesive application surface of the sheet bundle Sa, and grips the sheet bundle Sa with a front cover and a back cover being laminated on the front and back surfaces of the sheet bundle Sa.

After completion of the folding process of the cover K, the booklet forming section 80 descents by a prescribed distance to be retracted and stopped by descent drive of the elevating section 86. Thereafter, when the gripping by the gripping section is released, the booklet Sb falls, and the spine of the bottom surface of the booklet Sb is placed on an upper surface of the booklet ejection belt 88 with being brought to contact with it, then the booklet Sb is ejected.

In the above description, the book binding apparatus was used as the post processing apparatus, but the present invention is not limited to it, and the present invention is applicable to a post processing apparatus, which is provided with a perforation device and forms punched holes for use in filing. By using the perforation device of the present invention, the accuracy in position of punched holes can be enhanced, to result in enhancement of quality of filing.

What is claimed is:

1. A perforation device, comprising:
   a plurality of punches which punch holes on a sheet by a reciprocation motion;
   a holding member which holds the punches in a line in a width direction of the sheet;
   a plurality of dies being arranged opposing to the plurality of the punches;
   a drive shaft to be rotary driven by a driving device;
   two cranks being arranged with phases of an angle being displaced with each other in a shaft rotating direction of the drive shaft, to rotate together with the drive shaft; and
   two connection poles connecting with the two cranks and the holding member,
   wherein the two cranks are rotatable to reciprocate the holding member with phases at ends thereof being displaced in order to carry out a differential perforation of cut-outs with a time difference among perforations by each of the punches;
   wherein the reciprocation of the holding member continues in both directions at least until each of the punches reaches a perforation position where the punches perforate the sheet; and
   wherein holding positions of predetermined punches, among the punches held by the holding member, are displaced in a reciprocation direction with respect to the holding member, and wherein a lower most position which each of the punches reaches at differential perforation falls within a predetermined range.

2. The perforation device of claim 1, further comprising a sheet conveying part to convey the sheet before the differential perforation is carried out to a predetermined position where the punches overlap an edge of the sheet when the punches reach the perforation position.

3. A post-processing apparatus comprising the perforation device of claim 1, and a connection device to connect with an image forming apparatus.

4. The post-processing apparatus of claim 3, further comprising a book binding device to perform bookbinding using sheets on which images are formed by the image forming apparatus.

5. An image forming system, comprising:
an image forming apparatus which forms images on sheets; and
the post-processing apparatus of claim 3 which performs post-processing on the sheets on which images are formed by the image forming apparatus.

6. A post-processing apparatus, comprising:
the perforation device of claim 2;
a connection device to connect with an image forming apparatus; and
a book binding device to perform bookbinding by receiving sheets on which images are formed by the image forming apparatus;
the book binding device comprising:
   a storing section configured to store a plurality of the sheets perforated by the perforation device;
   a coating section configured to apply an adhesive to the sheet edges of the plurality of the sheets; and
   a booklet forming section configured to form a booklet by bonding a cover sheet onto the sheet edges.

\* \* \* \* \*